US012345094B2

(12) United States Patent
Binette

(10) Patent No.: US 12,345,094 B2
(45) Date of Patent: Jul. 1, 2025

(54) BALANCED SPRING-LOADED ROLLER BLIND, AND A TORSION SPRING, A METHOD, AND A SYSTEM THEREFOR

(71) Applicant: Jean-Sébastien Binette, Montréal (CA)

(72) Inventor: Jean-Sébastien Binette, Montréal (CA)

( * ) Notice: Subject to any disclaimer, the term of this patent is extended or adjusted under 35 U.S.C. 154(b) by 577 days.

(21) Appl. No.: 17/673,321

(22) Filed: Feb. 16, 2022

(65) Prior Publication Data

US 2023/0258040 A1 Aug. 17, 2023

(51) Int. Cl.
*E06B 9/42* (2006.01)
*E06B 9/60* (2006.01)

(52) U.S. Cl.
CPC . *E06B 9/42* (2013.01); *E06B 9/60* (2013.01)

(58) Field of Classification Search
CPC ................ E06B 9/42; E06B 9/60; E06B 9/56
See application file for complete search history.

(56) References Cited

U.S. PATENT DOCUMENTS 5,996,670 A * 12/1999 Igarashi .................... E06B 9/60 160/133
2002/0020315 A1* 2/2002 Siebolds ................ F16F 15/34 101/216
2007/0114196 A1* 5/2007 Cameron .............. A47F 5/0892 211/113
2016/0290043 A1* 10/2016 McPherson, Jr. ......... E06B 9/56
2019/0085629 A1* 3/2019 Fang ......................... E06B 9/42
2020/0270943 A1* 8/2020 Liarno ...................... E06B 9/60
2021/0363822 A1* 11/2021 Blair .................. H02K 11/0094

* cited by examiner

*Primary Examiner* — Beth A Stephan
(74) *Attorney, Agent, or Firm* — PRAXIS

(57) ABSTRACT

A method of making a roller blind is provided. The roller blind has a roller with a sheet mounted thereto for being rolled thereon and unrolled therefrom between first and second positions. At the first position, the sheet is fully rolled about the roller. At the second position, a hanging portion of the sheet hangs from roller in order to fully cover a window height. The portion rolled on the roller defines a roll therewith having a varying radius between the first and second positions. The hanging portion has a varying weight between the first and second positions. The spring is fitted into the roller. The blind provides a blind force on the spring equal to the varying weight multiplied by the varying radius. The spring is provided to have a spring constant with a numerical value that is equal to the numerical value of the weight of a sheet strip unrolled from the roll at a one radian rotation. Thus, the blind force is be equal to the spring force thereby balancing the roller blind. A rolled blind obtained by this method is provided.

16 Claims, 3 Drawing Sheets

BALANCED SPRING-LOADED ROLLER BLIND, AND A TORSION SPRING, A METHOD, AND A SYSTEM THEREFOR

TECHNICAL FIELD

The present disclosure generally relates to spring-loaded roller blinds such as spring driven and/or spring assisted roller blinds. More particularly, but not exclusively, the present disclosure is related to a balanced spring-loaded roller blind, a torsion spring, and a method and a system therefor.

BACKGROUND

Spring-loaded roller blinds such as spring driven and/or spring assisted roller blinds are well known in the art and commonly used. Roller blinds consist of solid sheets, housing structures including a hollow tube and a drive mechanism. The sheet is mounted at its top end to the hollow tube and has a bar at its bottom free end (or leading edge). The hollow tube houses a spring and is connected to the drive mechanism. Roller blinds are typically configured with the sheet rolling behind the roller, which keeps the blinds close to the window surface and maximizes the light blockage. The blinds can also roll in front of the tube.

The drive mechanism includes mechanical and motorized systems. Mechanical systems include chains or cords in conjunction with a brake system. When handling the chain or cord, the brake is released allowing the user to roll the blind to a desired height. The motorized mechanisms use a motor that drives the blind up to roll up or down at the desired position.

In spring-loaded blinds, the spring is wound and tightened when the blind is lowered, so that upon lifting the blind, the spring can release the stored energy and lift or assist the operator in lifting the blind. The direction of rotation to lift a roller blind depends on whether the sheet extends from the front of the roller or the back. The direction of rotation for rolling the sheet upwardly and winding it about the roller when the sheet is positioned in the back is clockwise whereas the roller is rotated in a counterclockwise position to extend the roller downwardly. In this case, a clockwise wound, torsion spring will be needed to drive or assist the winding up of the sheet. Indeed, the spring will be wound in the opposition direction of the position from which the sheet extends. Therefore, in a front drop blind, in which its roller needs to rotate counterclockwise to wind up its sheet about the roller, a counterclockwise wound, torsion spring will be needed to drive or assist the roller during lifting. Indeed, there are right wounded springs and left wounded springs depending on whether the spring has been positioned on the left or the right of the roller tube. The spring assistance reduces the force needed to operate the blind by adding a spring which releases stored energy upon lifting the blinds.

Mechanical drive systems without a cord or a chain, use a spring with one end being secured to a fixed part of the housing and the other end fixed to a moving part of the housing that winds (rolls up) or unwinds (rolls down) the blind. In these roller blinds, the spring stores more energy than is required to balance it so that the blind rolls down or rolls up on itself when pressure is applied to the bottom bar. This configuration requires a brake, a powerful spring, a limiter to interrupt its unwinding when the blind reaches the end of the race and a speed reducer to keep it from accelerating too much when it travels upwards or downwards.

Roller blinds with chains and cords are set to be discontinued in Canada for security reasons as they pose a hazard to young children and thus chainless and cordless roller blinds are to be the norm in the industry.

OBJECTS

An object of the present disclosure is to provide a spring-loaded roller blind.

An object of the present disclosure is to provide a torsion spring for a roller blind.

An object of the present disclosure is to provide a method for making a roller blind.

An object of the present disclosure is to provide a system for use in the making of a roller blind by determining a suitable torsion spring.

An object of the present disclosure is to provide a kit for the making of a roller blind.

SUMMARY

In accordance with an aspect of the present disclosure, there is provided a method of making a roller blind for selectively covering a window having a known height thereof, the method comprising: providing a cylindrical rotatable roller; mounting a sheet to the roller for being rolled thereon and unrolled therefrom during rotation of the roller between a first position at which the sheet is fully rolled about the roller and a second position wherein a hanging portion of the sheet hangs from roller in order to fully cover the window height, the sheet comprising a rolled portion thereof that is rolled about the roller between the first and second positions thereby defining a roll with the roller, the roll defining a lateral circular profile defining a roll radius that varies in length between the first and second positions, wherein the hanging portion of the sheet comprises a varying weight thereof between the first and second positions; mounting a torsion assembly to the roller, the torsion assembly comprising a rotatable torsion spring fitted within the roller for being rotated thereby during rolling and unrolling movement of the sheet between the first and second positions to provide a spring force in a direction opposite the rotational direction of the roller from the first to the second positions, wherein the blind provides a blind force on the spring that is a function of the varying weight of the sheet hanging portion multiplied by the varying radius of the roll between the first and second positions; determining the weight of a strip of the sheet that is unrolled from the roll at a one radian rotation of the roller, wherein the weight of the strip comprises a numerical value; and providing for the spring to have a spring constant thereof that has a numerical value equal to the numerical value of the weight of the strip at the one radian rotation between the first and second positions thereby providing for the blind force to be equal to the spring force between the first and second positions thereby balancing the roller blind.

In an embodiment, the step of determining the weight of a strip of the sheet that is unrolled from the roll at a one radian rotation of the roller comprises multiplying the surface area of the strip by the weight per square inch of the sheet. In an embodiment, the surface area of the strip is provided by the width of the sheet multiplied by a radius average of the varying radius. In an embodiment, wherein the average radius determined by the following equation: $R_{avg}=(R_t+R_{max})/2$, wherein, $R_t$ is the radius of the roller, wherein $R_{max}$ is the maximum radius of the roll at the first position. In an embodiment, the $R_{max}$ is determined by the following equation: $Rmax=\sqrt{(RLSA/\pi)}$, wherein RLSA is the surface area of the lateral circular profile.

In an embodiment, the varying radius of the roll between the first and second positions is provided in the form of a radius average. In an embodiment, the radius average is determined in accordance with the above paragraphs.

In an embodiment, providing for the spring to have a spring constant thereof that has a numerical value equal to the numerical value of the weight of the strip at the one radian rotation between the first and second positions comprises modifying the spring. In an embodiment, the spring before modification thereof comprises a given initial spring constant thereof and a given initial length thereof, wherein modification of the spring comprises shortening the initial length of the spring by a proportion that is equal to the provided spring constant divided by initial spring constant, wherein the initial length is divided by proportion to provide the modified length, wherein the modified length provides the spring constant that has the numerical value equal to the numerical value of the weight of the strip at the one radian rotation between the first and second positions.

In an accordance with an aspect of the present disclosure, there is provided a roller blind obtained by any one of the methods hereinabove.

In an accordance with an aspect of the present disclosure, there is provided a roller blind comprising for a window having a known height, the roller blind comprising: a cylindrical rotatable roller; a sheet mounted to the roller for being rolled thereon and unrolled therefrom during rotation of the roller between a first position at which the sheet is fully rolled about the roller and a second position wherein a hanging portion of the sheet hangs from roller in order to fully cover the window height, the sheet comprising a rolled portion thereof that is rolled about the roller between the first and second positions thereby defining a roll with the roller, the roll defining a lateral circular profile defining a roll radius that varies in length between the first and second positions, wherein the hanging portion of the sheet comprises a varying weight thereof between the first and second positions; and a torsion assembly mounted to the roller, the torsion assembly comprising a rotatable torsion spring fitted within the roller for being rotated thereby during rolling and unrolling movement of the sheet between the first and second positions to provide a spring force in a direction opposite the rotational direction of the roller from the first to the second positions, wherein the blind provides a blind force on the spring that is a function of the varying weight of the sheet hanging portion multiplied by the varying radius of the roll between the first and second positions, wherein a strip of the sheet that is unrolled from the roll at a one radian rotation of the roller has a given weight thereof comprising a numerical value, the spring having a spring constant thereof that has a numerical value equal to the numerical value of the weight of the strip at the one radian rotation between the first and second positions thereby providing for the blind force to be equal to the spring force between the first and second positions thereby balancing the roller blind.

In an accordance with an aspect of the present disclosure, there is provided a method for modifying a torsion spring to be used in a roller blind so as to balance the roller blind, the roller blind comprising: cylindrical rotatable roller, a sheet mounted to the roller for being rolled thereon and unrolled therefrom during rotation of the roller between a first position at which the sheet is fully rolled about the roller and a second position wherein a hanging portion of the sheet hangs from the roller in order to fully cover the window height, the sheet comprising a rolled portion thereof that is rolled about the roller between the first and second positions thereby defining a roll with the roller, the roll defining a lateral circular profile defining a roll radius that varies in diameter between the first and second positions, wherein the hanging portion of the sheet comprises a varying weight thereof between the first and second positions; and a torsion assembly mounted to the roller, the torsion assembly providing for receiving the torsion spring to be fitted within the roller for being rotated thereby during rolling and unrolling movement of the sheet between the first and second positions to provide a spring force in a direction opposite the rotational direction of the roller from the first to the second positions, wherein the blind provides a blind force on the torsion spring that is a function of the varying weight of the sheet hanging portion multiplied by the varying radius of the roll between the first and second positions, the method comprising: determining the weight of a strip of the sheet that is unrolled from the roll at a one radian rotation of the roller, wherein the weight of the strip comprises a numerical value; modifying the spring so as to provide for the spring to have a spring constant thereof that has a numerical value equal to the numerical value of the weight of the strip at the one radian rotation between the first and second positions comprises modifying the spring, wherein the spring before modification thereof comprises a given initial spring constant thereof and a given initial length thereof, wherein modification of the spring comprises shortening the initial length of the spring by a proportion that is equal to the provided spring constant divided by the initial spring constant, wherein the initial length is divided by the proportion to provide the modified length, wherein the modified length provides the spring constant that has the numerical value equal to the numerical value of the weight of the strip at the one radian rotation between the first and second positions.

In an accordance with an aspect of the present disclosure, there is provided a torsion spring obtained by the above method.

In an accordance with an aspect of the present disclosure, there is provided a kit for providing users to manufacture a roller blind for selectively covering a window having a known height thereof, the kit comprising a set of rules to follow in accordance with the above methods therefor.

In an accordance with an aspect of the present disclosure, there is provided a kit for providing users to modify a torsion spring, the kit comprising a set of steps to follow in accordance with the above method therefor.

In an accordance with an aspect of the present disclosure, there is provided a computer implemented system for determining the spring constant required for a torsion spring of a roller blind for a window having a height in order to balance the roller blind, the roller blind comprising a roller and a sheet mounted thereto, the system comprising: a controller having and an associated memory of a processor executable code; a client interface device in communication with the controller for providing client inputs thereto and to for transmitting controller outputs therefrom; wherein execution of the processor executable code causes the controller to execute real time computer implementable steps comprising: —receiving inputs from via the client interface device related to parameters of a roller blind comprising: (a) the radius of the roller; (b) the thickness of the sheet; (c) the width of the sheet; (d) the length of the sheet to cover the height of the window; (e) the weight of the sheet per square inches; —determining the numerical value of the weight of the sheet along the length at that is unrolled by the roller at one rad ($WFabx\_\theta$) by executing the following computer implementable steps: determining the average radius (Ravg)

of the roller with the sheet rolled thereon during movement of the sheet along the length of (d), wherein the average radius (Ravg) is provided by the equation: Ravg=(Rt+Rmax)/2, wherein Rt is the radius of the tube and Rmax is determined by the following equation: Rmax=√(RLSA/π) wherein RLSA is provided by the following equation: RLSA=TLSA+SRLSA, wherein TSLA is provided by the following equation: TLSA=π(Rt)2, wherein SRLSA is provided by the following equation: SRLSA=(MSPL)(STH), wherein MSPL is the length at (d) and STH is the sheet thickness; executing the following equation: Wfabx_θ=(Sw)(Ravg)(Wfab/in2), wherein Sw is (c) and Wfab/in2 is (e), wherein the numerical value of spring constant is equal to the numerical value of Wfabx_θ, —communicating the numerical value of the spring constant via the client interface device.

In an embodiment of computer implemented system, execution of the processor executable code causes the controller to execute computer implementable steps comprising: receiving inputs from via the client interface device related to a given spring in the possession of a client comprising a given spring constant of the given spring and a given spring length of the given spring; determining the modification of the given length in order for to for the given spring to have a modified spring constant that is equal to the communicated spring constant by calculating a proportion that is equal to the communicated spring constant divided by the given spring constant and calculating the modified length of the spring by dividing the given length by the proportion; communicating the modified length via the client interface device.

The present disclosure provides for a balanced spring-loaded blind so that the force to raise or lower the sheet (i.e. the force to roll/wind or unroll/unwind) is negligible and constant throughout the upward and downward movement of the sheet (i.e. clockwise and counterclockwise rotation of the roller). Moreover, when releasing the blind from this force, the sheet (and roller) stays in position without the use of a braking mechanism.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an aspect of the present disclosure, there is provided a accordance with an aspect of the present disclosure, there is provided a method of making a roller blind for selectively covering a window having a known height thereof.

A cylindrical rotatable roller is provided and a sheet is mounted thereto for being rolled thereon and unrolled therefrom during rotation of the roller between first and second positions. At the first position, the sheet is fully rolled about the roller. At the second position, a hanging portion of the sheet hangs from roller in order to fully cover the window height. The sheet comprises a rolled portion thereof that is rolled about the roller between the first and second positions thereby defining a roll with the roller. The roll defines a lateral circular profile defining a roll radius that varies in length between the first and second positions. The hanging portion of the sheet comprises a varying weight thereof between the first and second positions.

A torsion assembly is mounted to the roller and it comprises a rotatable torsion spring fitted within the roller for being rotated thereby during rolling and unrolling movement of the sheet between the first and second positions to provide a spring force in a direction opposite the rotational direction of the roller from the first to the second positions. The blind provides a blind force on the spring that is a function of the varying weight of the sheet hanging portion multiplied by the varying radius of the roll between the first and second positions.

The numerical value of the weight of a strip of the sheet that is unrolled from the roll at a one radian rotation of the roller is determined. The spring is provided to have a spring constant thereof that has a numerical value equal to the numerical value of the weight of the strip at the one radian rotation between the first and second positions thereby providing for the blind force to be equal to the spring force between the first and second positions thereby balancing the roller blind.

Figure 1:
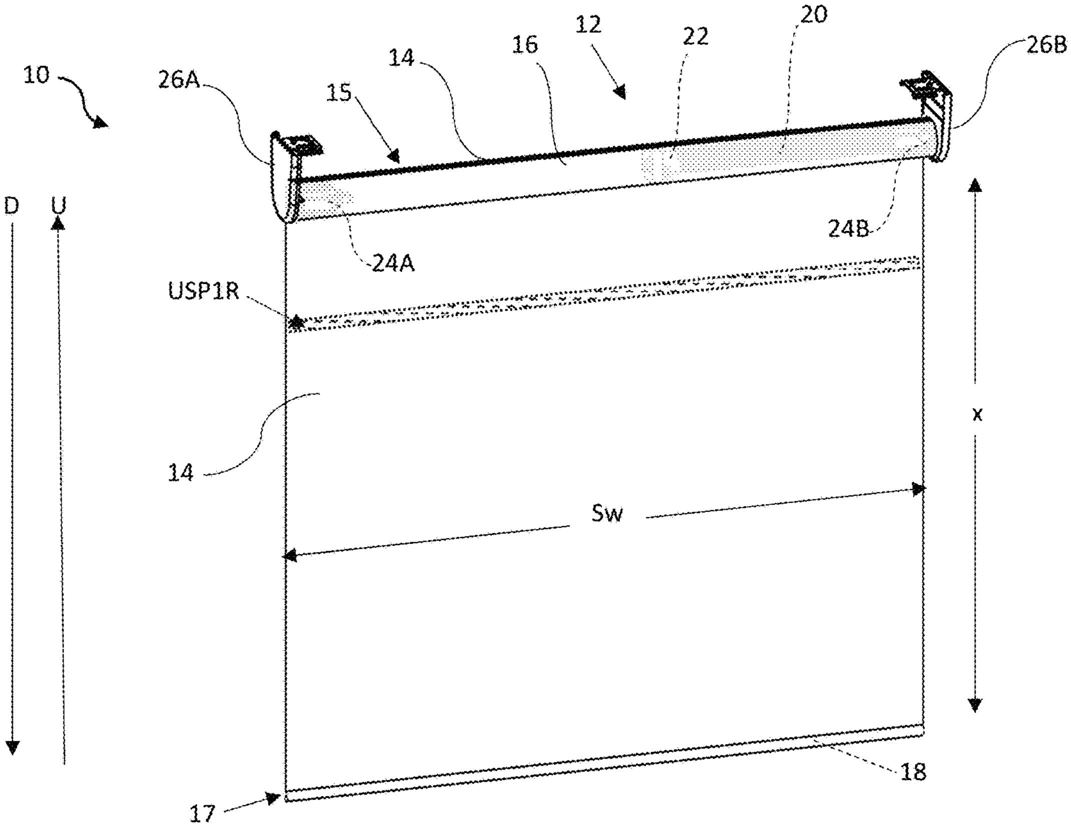
FIG. 1 is a front and side perspective view of a blind in accordance with a non-limiting illustrative embodiment of the present disclosure.
Figure 2:
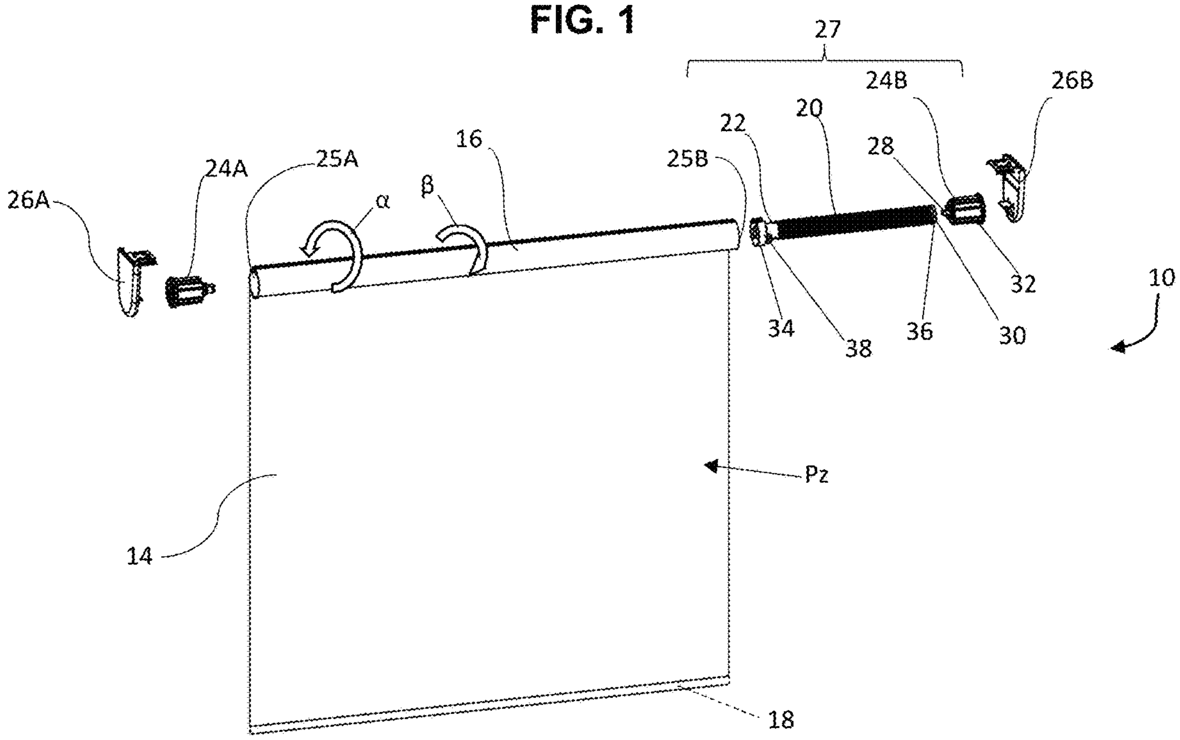
FIG. 2 is a front and side exploded perspective view of the blind of FIG. 1.

With reference to FIGS. 1 and 2, there is shown a blind 10 comprising a roll 12 which is comprised of a sheet 14 connected at a top end 15 thereof to a rotatable cylindrical roller 16 in the form of a hollow tube. The sheet 14 depends from the tube 16 and vertically downwardly extends therefrom forming from its top end 15 to its bottom end 17. A weight bar 18 is mounted to the bottom end 17 of the sheet 14 to weigh it down. The sheet 14 can be of a plurality of suitable materials usually fabric but other materials can also be contemplated by the skilled artisan and as desired by the user.

The hollow tube 16 houses a torsion spring 20 mounted to a shaft 22. A pair of idlers 24A and 24B respectively plug respective openings 25A and 25B at the longitudinal ends of the tube 16 and are respectively connected to respective outer bracket 26A and 26B which provide for mounting the blind 10 to an upper track or other surface as is well known in the art.

The blind 10 includes a torsion assembly 27 comprising the torsion spring 20 and shaft 22 and the idler 24B.

The spring 20 and shaft 22 are slidably positioned at one side of the tube via its opening 25B. The idler 24B is connected to the shaft 22. As is known in the art, idler 24B is at the spring-loaded end of the blind 10 and has an inner central first portion 28 thereof that is fixedly connected to the bracket 26B and to the outer longitudinal end 30 of the shaft 22. Moreover, the idler 24B has an outer second portion 32 thereof that is coaxial with the first inner portion 28 and that is not connected to the bracket 26B but snuggly fixedly connected to the tube 16 to rotate therewith. The shaft 22 has a rotatable part 34 opposite its end 30, this rotatable part is snuggly fitted within the tube 16 to rotate therewith.

The idler 24A is similarly constructed to idler 24B and is connected to the bracket 26A and fixedly snuggly connected to the tube 16 to be rotated therewith about the bracket 24A.

In this way, the tube 16 reciprocally rotates about the brackets 26A and 26B along the outer rotatable portions 32 of idlers 24A and 24B in the counterclockwise direction a dropping the sheet 14 in the downward direction D and in the clockwise direction 13 raising the sheet 14 in the upward direction U. Accordingly, the length of the sheet is positioned at a desired height x.

The end 30 of the shaft 22 is fixed to the inner portion 32 of the idler 24B and does not rotate with the tube providing for the shaft 22 not to rotate. The spring 20 has one end 36 connected to the fixed end 30 of the shaft 22 and another opposite end 38 connected to the rotatable part 34 which rotates relative to the rest of the shaft 22 along with the tube. In this way, a torsion force is applied to the spring 20 as one end 36 is fixed and another end 38 rotates. During torsion i.e. when the sheet 14 is rolled downwardly D causing the tube to roll in the counterclockwise direction a, the clockwise wound spring 38 stores energy as it is being slightly extended along the shaft 22 that is released during when the torsion force on the spring is released in order assist in raising of the sheet 14 in the U direction when rolling the tube in the clockwise direction 13.

A variety of torsion assemblies can be contemplated within the scope of the present disclosure.

Figure 3:
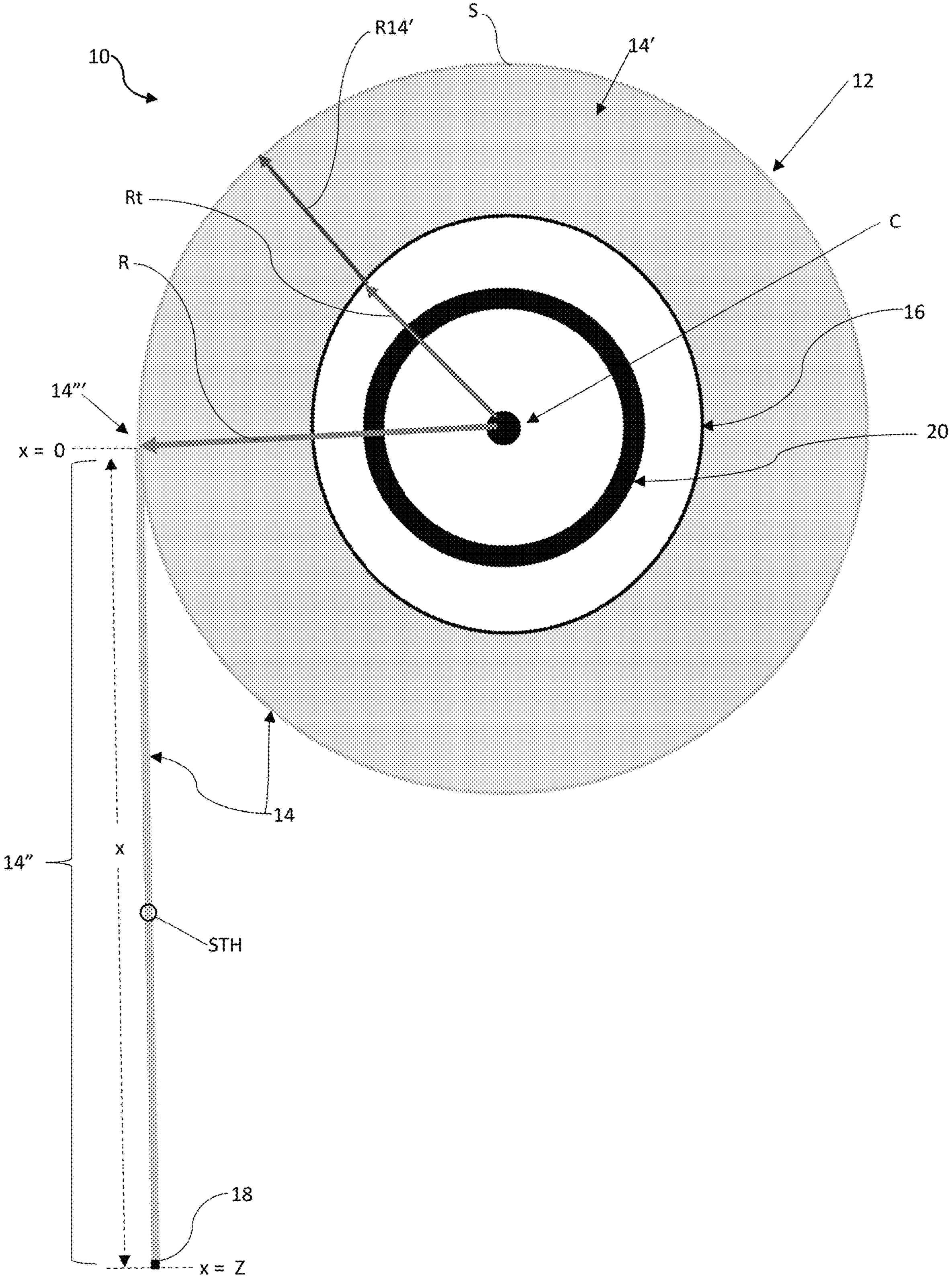
FIG. 3 is a lateral schematic view of a blind in accordance with a non-limiting illustrative embodiment of the present disclosure.

With reference to FIG. 3, there is shown a schematic representation of the blind 10, including the roll 12 comprising a roll of sheet 14 wound around the tube 16. The sheet 14 has a bottom bar 18. The tube 16 includes the torsion spring 20 therein and defines a center C which is the center of the torsion spring 20 and the roll 12.

In order to facilitate the description, the sheet 14 can be thought of as having three portions thereof that vary during upward U and downward D movements. These three portions are a first sheet portion 14', a second sheet portion 14" and a third sheet portion 14'". The first sheet portion 14' is the portion that is wound around the tube 16 and forms part of the roll 12. The second sheet portion 14" is the part of the sheet 14 that is hanging from the roll 12. The third sheet portion 14" is the junction between portions 14' and 14".

The first sheet portion 14' thus consists of a plurality of rolled layers of sheet 14, with the outermost layer defining the outermost surface S of the roll 12. The distance between the center C and the outermost surface S defines the radius R of the roll 12. The radius R of the roll 12 includes the radius of the tube 16, denoted herein as Rt and the additional portion of the rolled portion of the sheet 14, namely portion 14', this additional portion being denoted here as R14'.

FIG. 3 shows a schematic view of a lateral (or lateral sectional) view of the roll 12 and the hanging sheet portion (i.e. second sheet portion 14"). The radius R of the roll 12 varies during the in tandem movement of the sheet 14 (U or D) and roll 12 ($\alpha$ or $\beta$) since the R14' increases when adding material 14 thereto (during upward U movement of the sheet 14) and decreases when removing material 14 therefrom (during downward D movement of the sheet 14). The length x of the sheet portion 14" thus varies with the foregoing movement. When the roll 12 is at is maximum R, the sheet portion 14" is at its minimum x and at this position, the total surface lateral side circular surface area can be determined. The foregoing surface area is schematically shown in FIG. 3 but with the second portion 14" being at the minimum x (i.e. x=0) and in other words not hanging. Indeed, this is the surface area lateral circular profile of the roll 12. The foregoing surface area is denoted herein as 'RLSA' and refers to the Roll Lateral Surface Area. The RLSA incudes the lateral side circular surface of the tube 16 as schematically shown in FIG. 3 and denoted herein as 'TLSA' for Tube Lateral Surface Area. The RLSA also includes the surface area of the lateral side of the circular fully rolled up first sheet portion (as schematically shown in FIG. 3 but with the second portion 14" being at the minimum x (i.e. x=0) and R14' being at its maximum length. The forgoing surface area is denoted herein as 'SRLSA' for Sheet Roll Lateral Surface. Indeed, the RLSA=TLSA+SRLSA.

Turning to FIG. 1, the sheet 14 defines a width thereof, denoted herein as 'Sw'.

Turning back to FIG. 3, the sheet 14 defines a thickness thereof, denoted herein as 'STH'.

The sheet 14 has a known weight per square inches thereof and this is denoted herein as 'Wfab/in$^2$'.

The sheet 14 and more particularly, the second portion 14" moves upwardly and downwardly to define different lengths (x) thereof, between a minimal length x=0 (wherein the sheet 14 is no longer hanging from the roll 12 as previously mentioned) and a relatively 'maximum' desired length at x=Z. This maximum desired length is the length of the sheet 14 to cover the height of window. As such this when x=Z, the sheet 14" provides a panel Pz (see FIG. 2 as an example) that fully covers a window, the Pz is therefor the length of the panel formed by sheet portion 14" at it maximum length to cover the desired window and denoted herein as 'MSPL' for Maximum Sheet Panel Length.

The present disclosure is concerned with the movement of the sheet portion 14" along x between x=0 and x=Z as defined herein as this is the practical use of the blind 10.

The present disclosure provides a blind 10 in which the force of the weight of the sheet 14 when unrolled is proportional to the force of the spring 20. In fact, the force of the blind 10 (which will be described herein) and the force of the spring 20 (which will be described herein) should cancel themselves out. This cancellation of those two opposing forces provides a balanced spring-loaded blind so that the force to raise or lower the sheet portion 14" (i.e. the force to roll/wind or unroll/unwind) is negligible and constant throughout the upward U and downward D movement of the sheet portion 14" (i.e. clockwise a and counterclockwise 13 rotation of the roll 12). Moreover, when releasing the blind 10 from this force (exerted by the hand or by a motor), the sheet 14 (and roll 12) stays in position without the use of a braking mechanism.

The present disclosure provides for adjusting/modifying an available spring (such as 20) in such a way as to be meet the above performance as the panel portion 14" moves in the U and D direction between x=0 and x=Z as defined herein. This provides a balanced spring-loaded blind without the use of cords or chains (which are currently being phased out).

The present disclosure provides for adjusting/modifying an available spring 20 based on known parameters (features or characteristics) of the desired blind 10 structure. The known parameters include the radius of the tube 16 (Rt), the weight per square inch of the sheet 14 (Wfab/in$^2$), the thickness of the sheet 14 (STH), the width of the sheet 14 (Sw), length of a maximum sheet panel (Pz) at x=Z to cover the desired window (i.e. the MSPL). Finally, the disclosure provides for either making a spring 20 that has the desired spring constant K, selecting a spring 20 that has the desired spring constant K, or adjusting/modifying a spring having a known spring constant K as well as a known spring length (denoted herein as Ls) in order to have the desired spring constant K.

Hooke's law is a principle in physics that states that the force (F) needed to extend or compress a spring (s) by a rotational distance i.e. the distance counted in radians (θ) is proportional to that distance i.e. Fs=kθ.

The spring constant K can be provided in newtons per meters (N/m) as well as in ounces inches (or oz-in).

The force of the blind (Fb) 10 acting on the spring 20 is called a torque. This torque is in fact the weight of the unrolled hanging sheet portion 14" denoted herein as 'Wfab' in addition to the weight of the bottom bar 22, denoted herein as 'Wbb' multiplied by the radius R of the roll 12. Therefore, Fb=(Wfab+Wbb)(R). For the purposes of the present disclosure, the Wbb is not considered as the spring 20 will be pre-rotated (pre-wound) to cancel the Wbb as is well known in the art. It should be noted that the sheet portion 14' still wound around the tube 16 does not produce torque and therefore is not considered in the Fb.

The Fb, described hereinabove, is the torque at a given position (x) of the unrolled second sheet portion 14". Indeed, the weight of the sheet portion 14" (Wfab) varies based on the length (x) thereof as it moves (U or D) between x=0 and x=Z. The varying weight of the sheet portion 14" that varies between x=0 and x=Z is denoted herein as 'Wfabx'. Therefore, the force of the blind 10 will also vary along with the Wfabx, and this varying force of the blind 10 that varies with the varying weight of the sheet portion 14" between x=0 and x=Z is denoted herein as 'Fbx'.

The varying force Fbx is also in function of the varying radius R.

In the art, 2R is the diameter of the roll 12, the fully wound sheet 14 on the tube 12 (at x=0) and allows manufacturers know the size of the blind, what type of cassette is needed, or what projection of brackets or support is needed to house the roll 12. As previously explained, the radius R is the radius of the tube Rt plus the additional radius portion of the rolled sheet (R14') which varies with the upward U or downward D movement of the hanging sheet portion 14'. Thus R varies with each turn as R decreases during roll-down drops (α, D) and increases at roll-up raises (β, U). In fact, the radius R, progressively decreases as the length (x) of the second sheet portion 14" progressively increases from x=0 to x=Z thereby increasing the weight of the sheet portion 14". Therefore, R and Wfabx are inversely proportional In order to turn the varying R at each x (Rx) into a constant, we must determine the average radius R between x=0 and x-Z, this average radius is denoted herein as 'Ravg'.

Indeed, by determining the Ravg, the Fb at each x (i.e. Fbx) can be determined as Fbx=(Wfabx)(Ravg).

The Ravg is determined by the following equation:

$$Ravg = \frac{Rt + R\max}{2}$$

Rt is the radius of the tube and Rmax is the maximum radius of the roll 12 when the entire sheet 14 is wound on the tube 16 (at x=0) and is determined by the following equation:

$$R\max=\sqrt{RLSA/\pi}$$

As mentioned above, RLSA refers to Roll Lateral Surface Area and consists of the TLSA (Tube Later Surface Area) as well as the SRLSA (Sheet Roll Lateral Surface Area). Indeed, the RLSA is provided by the following equation:

$$RLSA=TLSA+SRLSA.$$

$$TSLA=\pi(Rt)^2, \text{ wherein } Rt \text{ is the radius of the tube.}$$

$$SRLSA=(MSPL)(STH).$$

Therefore, in the present example:

Once the RLSA is obtained we can then apply the formula below to determine the Rmax.

$$R\max=\sqrt{RLSA/\pi}$$

Having determined the Rmax and knowing the Rt, the equation below can be applied to obtain the Ravg:

$$Ravg = \frac{Rt + R\max}{2}$$

As mentioned above, the present disclosure provides for the force of the blind 10 between x=0 to x=Z acting on the spring 20 to be cancelled out by the force of the spring between x=0 to x=Z.

The force of the spring (denoted herein as Fs) is linearly proportional to the number of turns (or radians) of the roll 12 and the formula for this force is represented by Fs=kθ, wherein k is the spring constant and θ is the number of radians (RAD in SI Units). Each complete turn or revolution (i.e. 360 degrees) is equal to (2π)RAD (i.e. 1 revolution=(2π)RAD). For example, if the roll 12 has done three complete revolutions, the counter force of the spring (Fs) is equal to k multiple by (3 times 2πRAD=about 20), and Fs=K(20RAD).

The disclosure provides for determining the balance between the force of the blind (Fbx) acting on the spring between x=0 to x=Z and the force of the spring (Fs) for each θ (which translates into a portion of the sheet material 14 being unrolled, this portion is shown as USP1R in FIG. 1 and will be described further below). In other words, the configuration of the blind 10 must be so that Fbx−Fs=0. As previously mentioned, Fbx=(Wfabx)(Ravg) and Fs=Kθ and as such, (Wfabx)(Ravg)−(kθ)=0.

The present disclosure provides for determining the spring K which provides for balancing the force of the blind (Fbx) and the force of the spring so that Fbx−Fs=0. Indeed, the force due to the weight of the sheet hanging portion 14" at any desired length (i.e. Wfabx) is linearly proportional to the force of the spring 20 (i.e. Fs). Thus, the force of the weight of sheet portion 14" and the force of the spring 20 are balanced providing for the sheet portion 14" that stays in place once a user moves it upwardly or downwardly. This means that there is barely any effort required to move the sheet portion 14" as no force is acting against the movement along x.

As discussed above, Wfabx is a varying weight of a 14" at a given x as we unroll and roll-up sheet 14 (between x=0 and x=Z). Therefore, the Wfab (weight of the portion 14") varies in function of θ. Indeed, the sheet portion 14" adds 1 RAD worth of length (x) at each 1 RAD turn of the roll 12. As the unrolled hanging sheet portion 14" increases in x the R is reduced as there is 1 RAD less of sheet material 14' on the roll 12 with each turn and as the unrolled hanging sheet portion 14" decreases in x the R is increased as there is 1 RAD more of sheet material 14' on the roll 12. Since the R varies, we determined a mathematically constant Ravg to address this. Similarly, 1 RAD also varies along with the varying R, thus 1 RAD=Ravg and in consequence θ=Ravg in magnitude (integer value) and not in units. The Ravg is in essence the length (x) of the portion of the sheet 14 that is unrolled at 1 RAD. This portion is denoted here as 'USP1R' for Unrolled Sheet Portion at 1 RAD and is shown in FIG. 1 as a stripe of material of the sheet 14 having a width Sw and a height provided by 1 RAD turn.

Wfabx at 1 RAD is the weight of the USP1R and is denoted here as 'Wfbax_θ'.

Of course, the width (Sw) of sheet 14 remains constant throughout the rolling and unrolling process (represented by arrows 13 and a respectively in FIG. 2).

Determining the Wfabx at 1 RAD (i.e. Wfabx_θ) is determining the weight of the sheet portion that is unrolled at 1 RAD turn (i.e. the weight of the USP1R) and it is determined by the following equation:

$$Wfabx\_\theta=(\text{USP1R Surface Area})(Wfab/\text{in}^2)$$

The surface area of USP1R is equal to the width of the USP1R multiplied by length (height) of the USP1R which is represented by the equitation:

$$\text{USP1R}=(Sw)(R\text{avg}).$$

In the above equation, the length (x) of the USP1R is Ravg as such we are multiplying a width per height (length).

Accordingly, the equation for determining the Wfabx at 1 RAD turn (i.e. the Wfabx of the USP1R, denoted herein Wfabx_θ) is provided by the following equation:

$$Wfabx\_\theta=(Sw)(R\text{avg})(Wfab/\text{in}^2)$$

As previously described, the weight of the hanging sheet portion 14" is denoted Wfab and with this we can determine the torque on the spring 20 at a given x of the sheet portion 14" (which has a give weight) by the equation: Fb=(Wfab)(R). Yet, Fb is the force at a given weight and at a given radius of the roll R. The Wfabx allows us to determine the weight of sheet 14" as it varies between x=0 and x=Z and the Ravg provides a constant to the varying Rx between x=0 and x=Z. Hence, the force of the blind 10 between x=0 and x=Z (i.e. Fbx) is provided by the equation Fbx=(Wfabx)(Ravg). Having now determined that the Wfabx_θ is the weight of the rectangular strip (USP1R) of the sheet portion 14" which is unrolled at 1 RAD and that it is determined by the equation Wfabx_θ=(Sw)(Ravg)(Wfab/in$^2$), we can now conclude that the force of the blind at each 1 RAD (i.e. Fbx_θ) is equal to the Wfabx_θ multiplied by the Ravg and expressed by the following equation:

$$Fbx\_\theta=(Wfabx\_\theta)(R\text{avg}).$$

As the force of the spring 20 (Fs) is provided at each θ, the expression Fb=Fs is more precisely provided by the following: Fbx_θ=Fs and provided by the following equation:

$$(Wfabx\_\theta)(R\text{avg})=k\theta.$$

It was stated above that in terms of magnitude, the Ravg=height of the USP1R and the Ravg is the magnitude of θ, i.e. their numerical values are equal. Accordingly, we can eliminated Ravg and θ from each side of the equation and we arrive to the following conclusion:

$$Wfabx\_\theta|=|k|$$

Therefore, the desired k so that force of the blind 10 acting on the spring 20 throughout the movement of the sheet portion 14" between x=0 and x=Z is equal to the force of the spring at each radian turn thereof between x=0 and x=Z has the same integer value of weight of the sheet portion that is unrolled at radian each turn between x=0 and x=Z. Wherein 0 is the position of the sheet 14 when completely rolled on the tube and Z is the unrolled position of the sheet to fully cover a desired window having a known length thereof.

Therefore, if we have determined that the target K is K–t yet we have a given spring 20i with a given known constant, denoted here as K–i and a given known length (Ls) denoted here as Ls–i, we can modify spring 20i to have K–t by adjusting the length Ls–i in order to achieve Ls–Δ in accordance with following equation:

$$\frac{K-t}{K-i}=\frac{Ls-i}{Ls-\Delta}$$

Thus, $Ls-\Delta=Ls-i/(K-t/K-i)$.

Therefore, the spring length L–i, will be cut by the proportion of the target constant divided by the known constant to achieve the modified length Ls–Δ which will provide the target constant K–t to the spring 20i. This is achieved so the force Fs is inversely proportional to the length Ls of the spring 20.

Therefore, the length of the spring 20i is adjusted modified to Ls–Δ by determining the K–t based on the known parameters including: the Rt, the Wfab/in$^2$, the STH, the Sw, the MSPL, the K–i, and the Ls–i.

EXAMPLE

The present method will be exemplified by the following non-limiting illustrative example.

A blind manufacturer has the following known blind parameters:

| | |
|---|---|
| Tube radius (Rt) | 0.65 inches |
| Sheet weight per square inch (Wfab/in$^2$) | 0.01 oz/in$^2$ |
| Sheet thickness (STH) | 0.025 inches |
| Sheet width (Sw) | 60 inches |
| Length of a maximum sheet panel (MSPNL) | 96 inches |

The manufacturer in this example has a plurality of available springs with different and respective spring constants K. The manufacturer wants to determine what the required spring constant K is to balance the weight of the sheet portion 14" at any position (x).

The disclosure provides for determining the balance between the force of the blind (Fb) acting on the spring and the force of the spring (Fs). In other words, the configuration of the blind 10 must be so that Fb–Fs=0. As previously mentioned, Fb=(Wfabx)(Ravg) and Fs=Kθ and as such, (Wfabx)(Ravg)–(kθ)=0. Indeed, [Fbx_θ=(Wfabx_θ)(Ravg)]=[Fs=Kθ].

The Ravg is determined by the following equation:

$$Ravg=\frac{Rt+R\max}{2}$$

Rt is the radius of the tube which is 0.65 inches.

The Rmax is determined by the following equation:

$$R\text{max}=\sqrt{\text{RLSA}/\pi}$$

The RLSA is provided by the following equation:

$$\text{RLSA}=\text{TLSA}+\text{SRLSA}.$$

$TSLA=\pi(Rt)^2$, wherein Rt is the radius of the tube.

SRLSA=(MSPL)(STH).

Therefore, in the present example:

$RLSA=\pi(0.65\ \text{inches})^2+(96\ \text{inches})(0.025\ \text{inches})=3.737\text{in}^2$.

As $Rmax=\sqrt{RLSA/\pi}$, in this example, $Rmax=\sqrt{3.717\text{in}^2/\pi}=1.089$.

Having determined the Rmax, the equation below can be applied $$Ravg=\frac{Rt+R\max}{2}=\frac{0.65\ \text{in}+1.089\ \text{in}}{2}=0.87\ \text{in}.$$

We can apply the equation for determining the Wfabx_θ:

$Wfabx\_\theta=(\text{USP1R Surface Area})(Wfab/\text{in}^2)$

The following steps are therefore executed to apply the above equation:

$\text{USP1R Surface Area}=(Sw)(Ravg)$.

Hence, $Wfabx\_\theta=(Sw)(Ravg)(Wfab/\text{in}^2)$

In this example: $Wfabx\_\theta=(60\ \text{inches})(0.87\ \text{inches})(0.01\ \text{oz/in}^2)=0.522$ oz at 1 RAD.

As previously stated, Wfabx_θ=k=0.522.

Thus as the magnitude the required K is 0.522, our target constant K–t is 0.522 oz-in. In the present example, the manufacturer has in their possession a spring 20i having a spring constant K–i of 0.4 oz-in and a length Ls–i of 15 inches.

The present disclosure provides for cutting this spring **20*i*** in order to achieve the target spring constant K–t.

This is provided by the following equation:

$Ls-\Delta=Ls-i/(K-t/K-i)=15\ \text{inches}/(0.522\ \text{oz-in.}/0.4\ \text{oz-in})=15\ \text{inches}\ (1.305)=11.5$.

Therefore, cutting the length of the spring 20i from 15 inches to 11.5 inches will achieve the target spring constant of 0.522.

By assembling the blind with the above parameters provided and with this modified spring, the Fbx=Fs between x=0 and x=Z, the Fbx_θ=Fs at each 1 RAD turn between x=0 and x=Z and in essence the Fb=Fs. As such, Fb–Fs=0 and thus this blind is balanced as defined herein.

Figure 4:
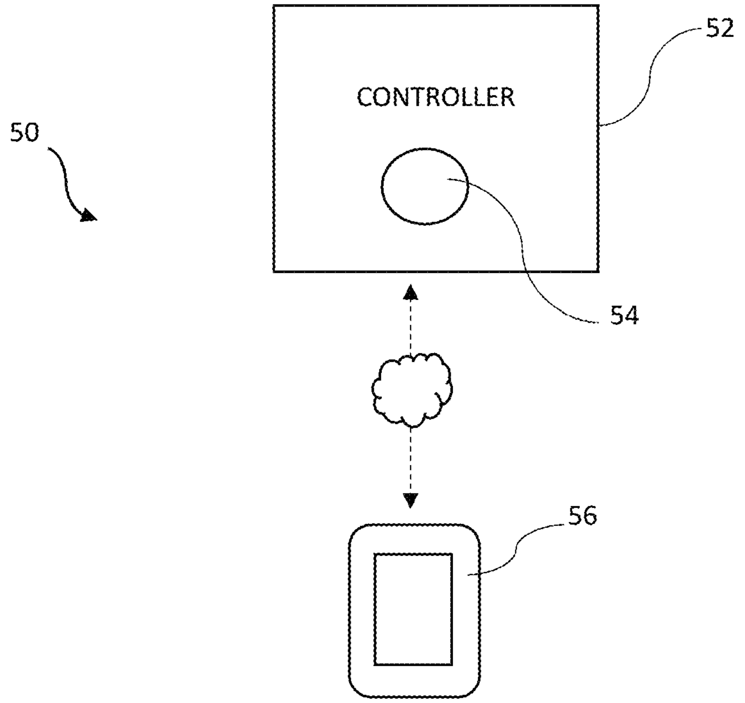
FIG. 4 is schematic representation of a computer implemented system for determining the spring constant required for a torsion spring of a roller blind.

With reference to FIG. 4, there is a computer implemented system 50 for determining the spring constant required for a torsion spring of a roller blind for a window having a height in order to balance the roller blind.

The system 50 comprising a controller 52 having and an associated memory 54 of a processor executable code.

A client interface device 56 is in wire or wireless communication (such as a network communication) with the controller 52 for providing client inputs thereto and to for transmitting controller outputs therefrom.

Execution of the processor executable code causes the controller 52 to execute real time computer implementable steps comprising: —receiving inputs from via the client interface device related to parameters of a roller blind comprising: (a) the radius of the roller; (b) the thickness of the sheet; (c) the width of the sheet; (d) the length of the sheet to cover the height of the window; (e) the weight of the sheet per square inches; —determining the numerical value of the weight of the sheet along the length at that is unrolled by the roller at one rad (WFabx_θ) by executing the following computer implementable steps: determining the average radius (Ravg) of the roller with the sheet rolled thereon during movement of the sheet along the length of (d), wherein the average radius (Ravg) is provided by the equation: Ravg=(Rt+Rmax)/2, wherein Rt is the radius of the tube and Rmax is determined by the following equation: Rmax=√(RLSA/π) wherein RLSA is provided by the following equation: RLSA=TLSA+SRLSA, wherein TSLA is provided by the following equation: TLSA=Tr(Rt)2, wherein SRLSA is provided by the following equation: SRLSA=(MSPL)(STH), wherein MSPL is the length at (d) and STH is the sheet thickness; executing the following equation: Wfabx_θ=(Sw)(Ravg)(Wfab/in2), wherein Sw is (c) and Wfab/in2 is (e), wherein the numerical value of spring constant is equal to the numerical value of Wfabx_θ, —communicating the numerical value of the spring constant via the client interface device 56.

Execution of the processor executable code causes the controller 52 to execute computer implementable steps comprising: receiving inputs from via the client interface device 56 related to a given spring in the possession of a client comprising a given spring constant of the given spring and a given spring length of the given spring; determining the modification of the given length in order for to for the given spring to have a modified spring constant that is equal to the communicated spring constant by calculating a proportion that is equal to the communicated spring constant divided by the given spring constant and calculating the modified length of the spring by dividing the given length by the proportion; communicating the modified length via the client interface device 56.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A method of making a roller blind for selectively covering a window having a known height thereof, the method comprising:

providing a cylindrical rotatable roller;

mounting a sheet to the roller for being rolled thereon and unrolled therefrom during rotation of the roller between a first position at which the sheet is fully rolled about the roller and a second position wherein a hanging portion of the sheet hangs from the roller in order to fully cover the window height, the sheet comprising a rolled portion thereof that is rolled about the roller between the first and second positions thereby defining a roll with the roller, the roll defining a lateral circular profile defining a roll radius that varies in diameter between the first and second positions, wherein the hanging portion of the sheet comprises a varying weight thereof between the first and second positions;

mounting a torsion assembly to the roller, the torsion assembly comprising a rotatable torsion spring fitted within the roller for being rotated thereby during rolling and unrolling movement of the sheet between the first and second positions to provide a spring force in a direction opposite the rotational direction of the roller from the first to the second positions, wherein the blind provides a blind force on the spring that is a function of the varying weight of the sheet hanging portion multiplied by the varying radius of the roll between the first and second positions;

determining the weight of a strip of the sheet that is unrolled from the roll at a one radian rotation of the roller, wherein the weight of the strip comprises a numerical value; and providing for the spring to have a spring constant thereof that has a numerical value equal to the numerical value of the weight of the strip at the one radian rotation between the first and second positions thereby providing for the blind force to be equal to the spring force between the first and second positions thereby balancing the roller blind.

2. A method according to claim 1, wherein the step of determining the weight of a strip of the sheet that is unrolled from the roll at a one radian rotation of the roller comprises multiplying a surface area of the strip by the weight per square inch of the sheet.

3. A method according claim 2, wherein the surface area of the strip is provided by the width of the sheet multiplied by a radius average of the varying radius.

4. A method according to claim 3, wherein the average radius is determined by an equation comprising:

$$Ravg = \frac{Rt + R\max}{2}$$

wherein, Rt is the radius of the roller, wherein Rmax is the maximum radius of the roll at the first position.

5. A method according to claim 4, wherein the Rmax is determined by an equation comprising:

$$R\max=\sqrt{RLSA/\pi}$$

wherein RLSA is the surface area of the lateral circular profile.

6. A method according to claim 1, wherein the varying radius of the roll between the first and second positions is provided in the form of a radius average.

7. A method according to claim 1, wherein providing for the spring to have a spring constant thereof that has a numerical value equal to the numerical value of the weight of the strip at the one radian rotation between the first and second positions comprises modifying the spring.

8. A method according to claim 7, wherein the spring before modification thereof comprises a given initial spring constant thereof and a given initial length thereof, wherein modification of the spring comprises shortening the initial length of the spring by a proportion that is equal to the provided spring constant divided by the initial spring constant, wherein the initial length is divided by the proportion to provide the modified length, wherein the modified length provides the spring constant that has the numerical value equal to the numerical value of the weight of the strip at the one radian rotation between the first and second positions.

9. A roller blind obtained by the method of claim 1.

10. A roller blind comprising for a window having a known height, the roller blind comprising:

a cylindrical rotatable roller;

a sheet mounted to the roller for being rolled thereon and unrolled therefrom during rotation of the roller between a first position at which the sheet is fully rolled about the roller and a second position wherein a hanging portion of the sheet hangs from the roller in order to fully cover the window height, the sheet comprising a rolled portion thereof that is rolled about the roller between the first and second positions thereby defining a roll with the roller, the roll defining a lateral circular profile defining a roll radius that varies in diameter between the first and second positions, wherein the hanging portion of the sheet comprises a varying weight thereof between the first and second positions; and a torsion assembly mounted to the roller, the torsion assembly comprising a rotatable torsion spring fitted within the roller for being rotated thereby during rolling and unrolling movement of the sheet between the first and second positions to provide a spring force in a direction opposite the rotational direction of the roller from the first to the second positions, wherein the blind provides a blind force on the spring that is a function of the varying weight of the sheet hanging portion multiplied by the varying radius of the roll between the first and second positions, wherein a strip of the sheet that is unrolled from the roll at a one radian rotation of the roller has a given weight thereof comprising a numerical value, the spring having a spring constant thereof that has a numerical value equal to the numerical value of the weight of the strip at the one radian rotation between the first and second positions thereby providing for the blind force to be equal to the spring force between the first and second positions thereby balancing the roller blind.

11. A method for modifying a torsion spring to be used in a roller blind so as to balance the roller blind, the roller blind comprising: cylindrical rotatable roller, a sheet mounted to the roller for being rolled thereon and unrolled therefrom during rotation of the roller between a first position at which the sheet is fully rolled about the roller and a second position wherein a hanging portion of the sheet hangs from the roller in order to fully cover the window height, the sheet comprising a rolled portion thereof that is rolled about the roller between the first and second positions thereby defining a roll with the roller, the roll defining a lateral circular profile defining a roll radius that varies in diameter between the first and second positions, wherein the hanging portion of the sheet comprises a varying weight thereof between the first and second positions; and a torsion assembly mounted to the roller, the torsion assembly providing for receiving the torsion spring to be fitted within the roller for being rotated thereby during rolling and unrolling movement of the sheet between the first and second positions to provide a spring force in a direction opposite the rotational direction of the roller from the first to the second positions, wherein the blind provides a blind force on the torsion spring that is a function of the varying weight of the sheet hanging portion multiplied by the varying radius of the roll between the first and second positions, the method comprising:

determining the weight of a strip of the sheet that is unrolled from the roll at a one radian rotation of the roller, wherein the weight of the strip comprises a numerical value;

modifying the torsion spring so as to provide for the spring to have a spring constant thereof that has a numerical value equal to the numerical value of the weight of the strip at the one radian rotation between the first and second positions comprises modifying the spring, wherein the spring before modification thereof comprises a given initial spring constant thereof and a given initial length thereof, wherein modification of the spring comprises shortening the initial length of the spring by a proportion that is equal to the provided spring constant divided by the initial spring constant, wherein the initial length is divided by the proportion to provide the modified length, wherein the modified length provides the spring constant that has the numerical value equal to the numerical value of the weight of the strip at the one radian rotation between the first and second positions.

12. A torsion spring obtained by the method of claim 11.

13. A kit for providing users to manufacture a roller blind for selectively covering a window having a known height thereof, the kit comprising a set of rules to follow in accordance with the method of claim 1.

14. A kit for providing users to modify a torsion spring, the kit comprising a set of steps to follow in accordance with the method of claim 1.

15. A computer implemented system for determining a spring constant required for a torsion spring of a roller blind for a window having a height in order to balance the roller blind, the roller blind comprising a roller and a sheet mounted thereto, the system comprising:

a controller having an associated memory of a processor executable code;

a client interface device in communication with the controller for providing client inputs thereto and for transmitting controller outputs therefrom;

wherein execution of the processor executable code causes the controller to execute real time computer implementable steps comprising:

receiving inputs via the client interface device related to parameters of a roller blind comprising:

(a) a radius of the roller;

(b) a thickness of the sheet;

(c) a width of the sheet;

(d) a length of the sheet to cover the height of the window;

(e) a weight of the sheet per square inches;

determining a numerical value of the weight of the sheet along a length of the sheet that is unrolled by the roller at one radian (WFabx_θ) by executing the following computer implementable steps:

determining an average radius (Ravg) of the roller with the sheet rolled thereon during movement of the sheet along the length of (d), wherein the average radius (Ravg) is provided by an equation comprising:

$$Ravg = \frac{Rt + R\max}{2}$$

wherein Rt is a radius of the roller without the sheet and Rmax is determined by an equation comprising:

$$R\text{max}=\sqrt{\text{RLSA}/\pi}$$

wherein RLSA is provided by the following equation:

$$\text{RLSA}=\text{TLSA}+\text{SRLSA}$$

wherein TSLA is provided by the following equation:

$$\text{TLSA}=\pi(Rt)^2$$

wherein SRLSA is provided by the following equation:

$$\text{SRLSA}=(\text{MSPL})(\text{STH})$$

wherein MSPL is the length at (d) and STH is the sheet thickness;

executing an equation comprising:

$$Wfabx\_\theta=(Sw)(R\text{avg})(Wfab/\text{in}^2)$$

wherein Sw is (c) and $Wfab/in^2$ is (e), wherein Wfabx_θ is a numerical value of the weight of the sheet along a length of the sheet that is unrolled by the roller at one radian wherein Wfab is the weight of the sheet wherein a numerical value of the spring constant is equal to a numerical value of Wfabx_θ communicating the numerical value of the spring constant via the client interface device.

16. A computer implemented system according to claim 15, wherein execution of the processor executable code causes the controller to execute computer implementable steps comprising:

receiving inputs via the client interface device related to a given client comprising a given spring constant of the given client spring and a given spring length of the given client spring;

determining a modification of the given length (modified length) that provides the given client spring to have a modified spring constant that is equal to the communicated spring constant by calculating a proportion that is equal to the communicated spring constant divided by the given spring constant and calculating the modified length of the spring by dividing the given length by the proportion;

communicating the modified length via the client interface device.

* * * * *